(12) United States Patent
Rakusin et al.

(10) Patent No.: US 10,652,642 B1
(45) Date of Patent: May 12, 2020

(54) KEYPAD LIGHT RING FOR AUDIO DEVICE

(71) Applicant: Bose Corporation, Framingham, MA (US)

(72) Inventors: Evan Scott Rakusin, North Reading, MA (US); Colin Taylor Mosgrove, Needham, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/225,939

(22) Filed: Dec. 19, 2018

(51) Int. Cl.
*G02B 5/02* (2006.01)
*H04R 1/02* (2006.01)
*H01H 13/83* (2006.01)

(52) U.S. Cl.
CPC .......... *H04R 1/028* (2013.01); *G02B 5/0205* (2013.01); *H01H 13/83* (2013.01); *H01H 2219/036* (2013.01)

(58) Field of Classification Search
None
See application file for complete search history.

(56) References Cited

U.S. PATENT DOCUMENTS

| | | | |
|---|---|---|---|
| 9,304,736 B1* | 4/2016 | Whiteley | G06Q 20/40145 |
| 9,574,762 B1* | 2/2017 | Grillo | F21V 33/0056 |
| 2010/0072047 A1* | 3/2010 | Sung | H01H 13/83 |
| | | | 200/314 |
| 2014/0168995 A1* | 6/2014 | Chen | F21V 5/043 |
| | | | 362/311.02 |
| 2018/0182294 A1* | 6/2018 | Radhakrishnan | G09G 3/3241 |

* cited by examiner

*Primary Examiner* — James K Mooney
(74) *Attorney, Agent, or Firm* — Hoffman Warnick LLC

(57) ABSTRACT

Various implementations include audio devices and components of such devices. In some particular cases, a keypad for an audio device includes a base having an array of circumferentially separated slots. The keypad further includes a set of light emitting diodes (LEDs) each located in a corresponding one of the slots in the base, and a cover over the base and the set of LEDs. The cover has a set of lenses each corresponding with one of the LEDs and forming a space over the corresponding LED to diffuse light from the corresponding LED, such that when powered, the set of LEDs is configured to provide a continuous ring of light around the keypad.

16 Claims, 10 Drawing Sheets

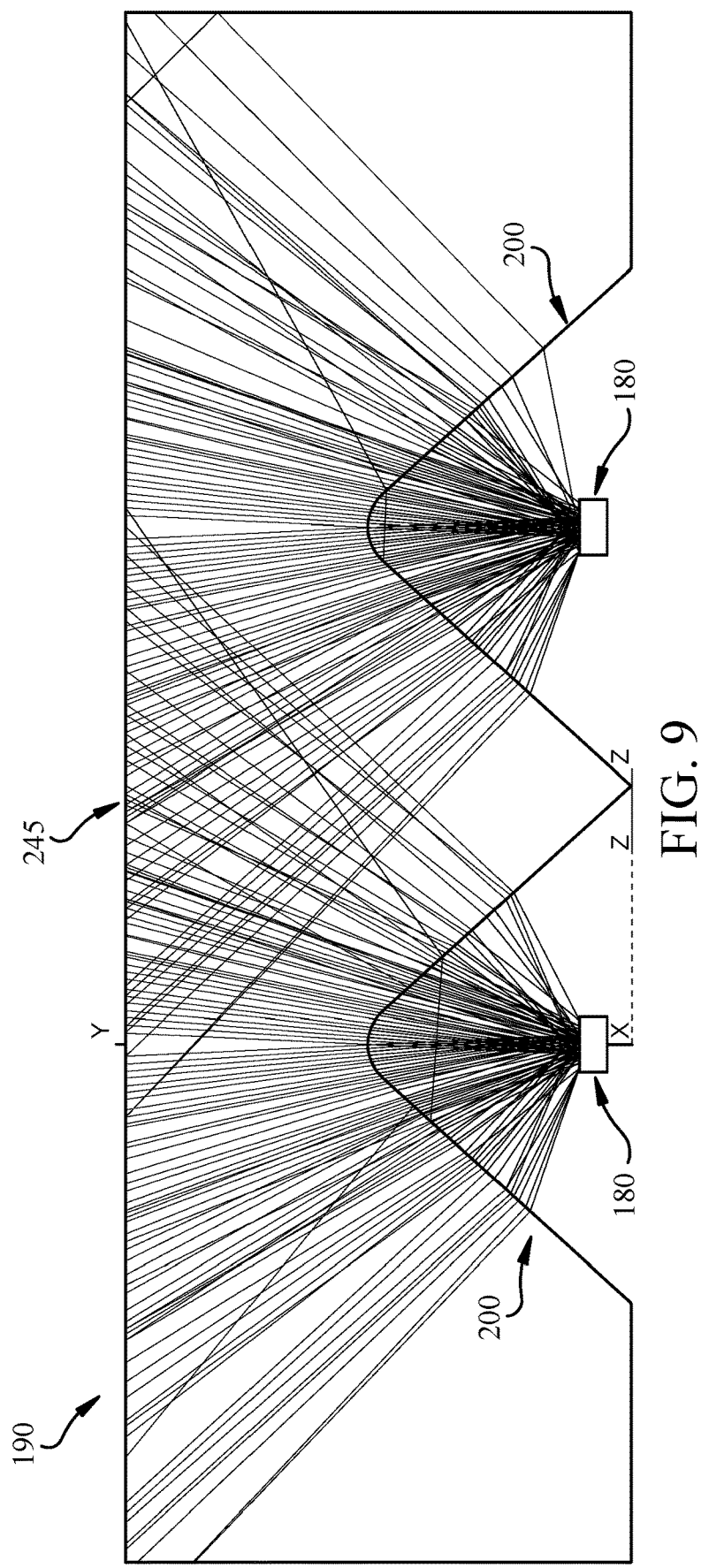

KEYPAD LIGHT RING FOR AUDIO DEVICE

TECHNICAL FIELD

This disclosure generally relates to audio devices. More particularly, the disclosure relates to an audio device having a keypad light ring for diffusing light from an underlying set of light emitting diodes (LEDs).

BACKGROUND

There is an increasing demand for portable audio devices, in particular, battery-powered portable audio devices. However, controlling battery usage in such devices is challenging.

SUMMARY

All examples and features mentioned below can be combined in any technically possible way, Various implementations include audio devices and components of such devices. Certain implementations include a keypad for an audio device with a set of lenses for diffusing light from a set of underlying light emitting diodes (LEDs). When powered, the set of LEDs can provide a continuous ring of light around the keypad.

In particular aspects, a keypad for an audio device includes: a base having an array of circumferentially separated slots; a set of light emitting diodes (LEDs) each located in a corresponding one of the slots in the base; and a cover over the base and the set of LEDs, where the cover includes a set of lenses each corresponding with one of the LEDs and forming a space over the corresponding to diffuse light from the corresponding LED, where when powered, the set of LEDs is configured to provide a continuous ring of light around the keypad.

In another aspect, an audio device includes: a transducer for providing an acoustic output; a control circuit for controlling the acoustic output at the transducer; and a keypad coupled with the control circuit for receiving interface commands, the keypad including: a base including an array of circumferentially separated slots; a set of light emitting diodes (LEDs) each located in a corresponding one of the slots in the base; and a cover over the base and the set of LEDs, where the cover includes a set of lenses each corresponding with one of the LEDs and forming a space over the corresponding LED to diffuse light from the corresponding LED, and where when powered, the set of LEDs is configured to provide a continuous ring of light around the keypad.

Implementations may include one of the following features, or any combination thereof.

In some cases, the continuous ring of light has an approximately consistent intensity around the keypad as measured from a reference location.

In certain aspects, the lens over each LED widens a light emission from the LED such that the light emission from adjacent LEDs in the set of LEDs overlaps.

In particular implementations, the cover includes silicone.

In some aspects, the keypad further includes a core section arranged radially inside the array, where the core section includes additional LEDs for illuminating selectable buttons in the core section.

In certain cases, the cover further includes additional lenses each corresponding with one of the additional LEDs and forming a space over each corresponding additional LED to diffuse light from each corresponding additional LED.

In particular aspects, the keypad further includes a support structure in the core section for supporting the cover.

In some implementations, the support structure prevents bleeding of light between the set of LEDs and the additional LEDs.

In certain cases, a center-to-center separation of adjacent LEDs in the set along a circumferentially extending line is at least 8-12 millimeters.

In particular implementations, a top of each of the LEDs is separated from a corresponding lens by at least 1-2 millimeters.

In some aspects, each of the lenses has a curved shape or includes multiple sections having distinct slopes.

In certain implementations, each lens diffuses the light from a corresponding one of the set of LEDs such that when actuated according to a programmed pattern, the set of LEDs provide a continuous, progressive ring of light in either a clockwise direction or a counterclockwise direction.

In particular cases, when compared with a reference set of LEDs around a same circumferential distance as defined by the base, the set of LEDs has one-half as many LEDs as the reference set of LEDs with a substantially identical continuity in the ring of light around the keypad.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

FIG. 9 is a schematic depiction of light emissions from adjacent lensed LEDs according to various implementations.

Figure 1:
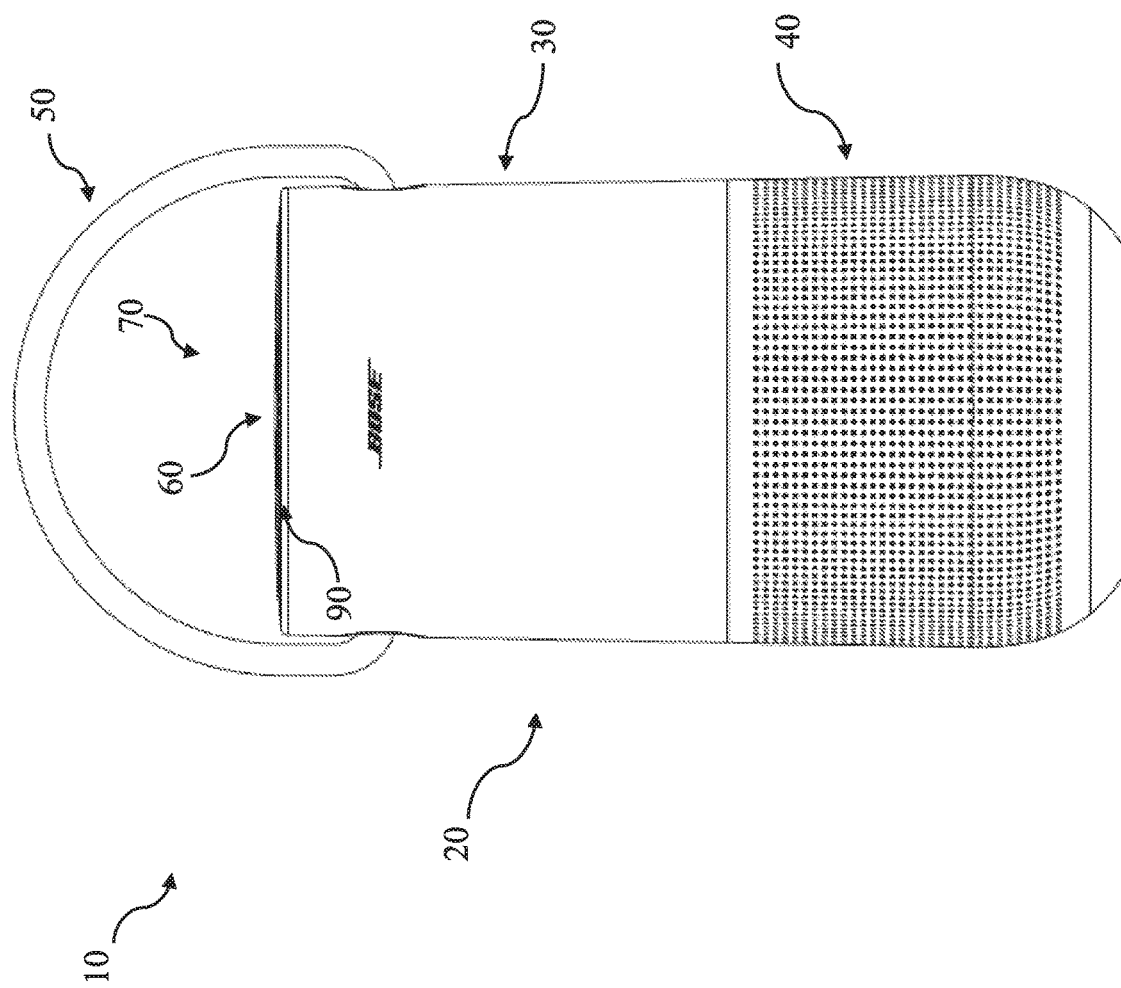
FIG. 1 shows a front perspective view of an audio device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a keypad light ring with an arrangement of lenses can be beneficially incorporated into an audio device. For example, an audio device having a set of light diffusing lenses can provide desired keypad display features while managing battery usage.

Commonly labeled components in the FIGURES are considered to be substantially equivalent components for the purposes of illustration, and redundant discussion of those components is omitted for clarity.

As described herein, controlling power usage in audio devices is a significant consideration in device design. Many conventional audio devices have keypads with lighting configurations for visually indicating particular functions. For example, conventional audio devices use lighting display(s) to demonstrate adjustments in playback, indicate available keypad functions for a particular operating mode, correlate a lighting configuration with a style or mood of the playback, or to indicate interaction between a user and a virtual personal assistant (WA) running on the audio device. While these lighting configurations can enhance the user experience, they also require significant power resources.

In contrast to conventional audio device keypads, various implementations include an audio device keypad with a cover having a set of lenses for diffusing light from a set of underlying light emitting diodes (LEDs). In certain implementations, the lens configuration in the audio keypad allows for use of half as many LEDs as in conventional keypads, which significantly reduces power usage. In some implementations, the LEDs may be reduced by at least 30, 40, or 50 percent, which provides corresponding cost and power savings. In some cases, power savings are also achieved due to the efficiency of the lenses described herein, which can help achieve relatively higher brightness levels than if the lenses were not utilized, thereby removing the need to otherwise turn up the brightness and consumer more power. In some implementations, the luminosity (e.g., as measured in lux) or luminance (e.g., as measured in candelas per square meter ($cd/m^2$)) of the keypad light ring varies across the ring by at most 15, 10, or 5 percent when fully illuminated due to use of one of the lens configurations described herein, thereby providing a relatively uniform visual brightness and enhancing the user experience.

Although the keypad light ring is primarily described herein for an audio device, the present disclosure is not intended to be so limited. For example, in some implementations, the keypad light ring can be used for other electronic devices, including, but not limited to: clocks; doorbells; thermostats; remote controls; computer peripherals, such as keyboards or mice; video recording devices; video playback devices; microphone devices; smart home devices, such as control systems or appliances; and automobile system displays and/or related interfaces. The light sources described herein are primarily described in the context of LEDs, which include various colors of LEDs, such as white LEDs, RGB LEDs (which typically consist of one red, one green, and one blue LED), blue LEDs, and so forth. Also, the LEDs described herein can include various different materials, such as where the emissive layer of the diode includes an organic compound, which are referred to as organic LEDs ((LEDs). However, the present disclosure is not intended to be so limited, as the keypad light ring as variously described herein can be illuminated with other light sources.

Figure 2:
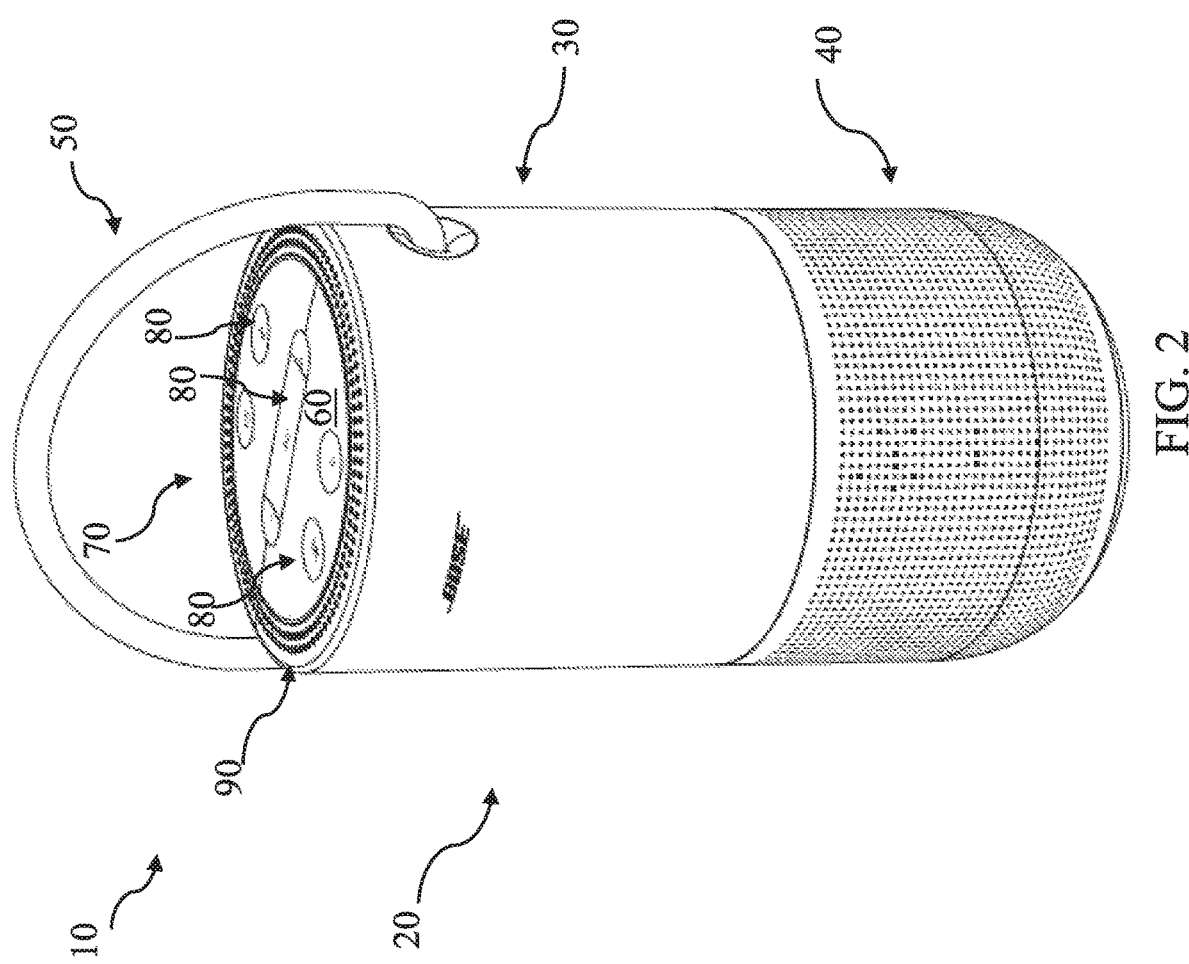
FIG. 2 shows a top perspective view of the audio device of FIG. 1, illustrating aspects of the keypad.

FIG. 1 shows a side perspective view of an audio device 10 and FIG. 2 shows a top perspective view of the audio device 10, according to various implementations. In some cases, the audio device 10 includes a portable audio device such as a tabletop or handheld speaker that has capability for both hard-wired and battery powered operation. The audio device 10 has a main body 20 including a housing 30 containing speaker components such as one or more transducers, resonators, digital signal processors (DSPs) and related control circuitry. The audio device 10 can also include a speaker grille 40, which is shown in the example depiction in FIG. 1 as extending around the base of the main body 20. In some cases, a handle 50 is connected with the main body 20, for example, to enable transport of the audio device 10.

In the example depiction of audio device 10, in particular as shown in FIG. 2, a keypad 60 is shown on a face 70 of the main body 20, e.g., on a top face of the main body 20. As described herein, the keypad 60 can include a plurality of keys 80 for actuating functions of the audio device 10, e.g., playback functions, volume control, device pairing, etc. Additionally, the keypad 60 can include a light ring 90 extending around the face 70.

Figure 3:
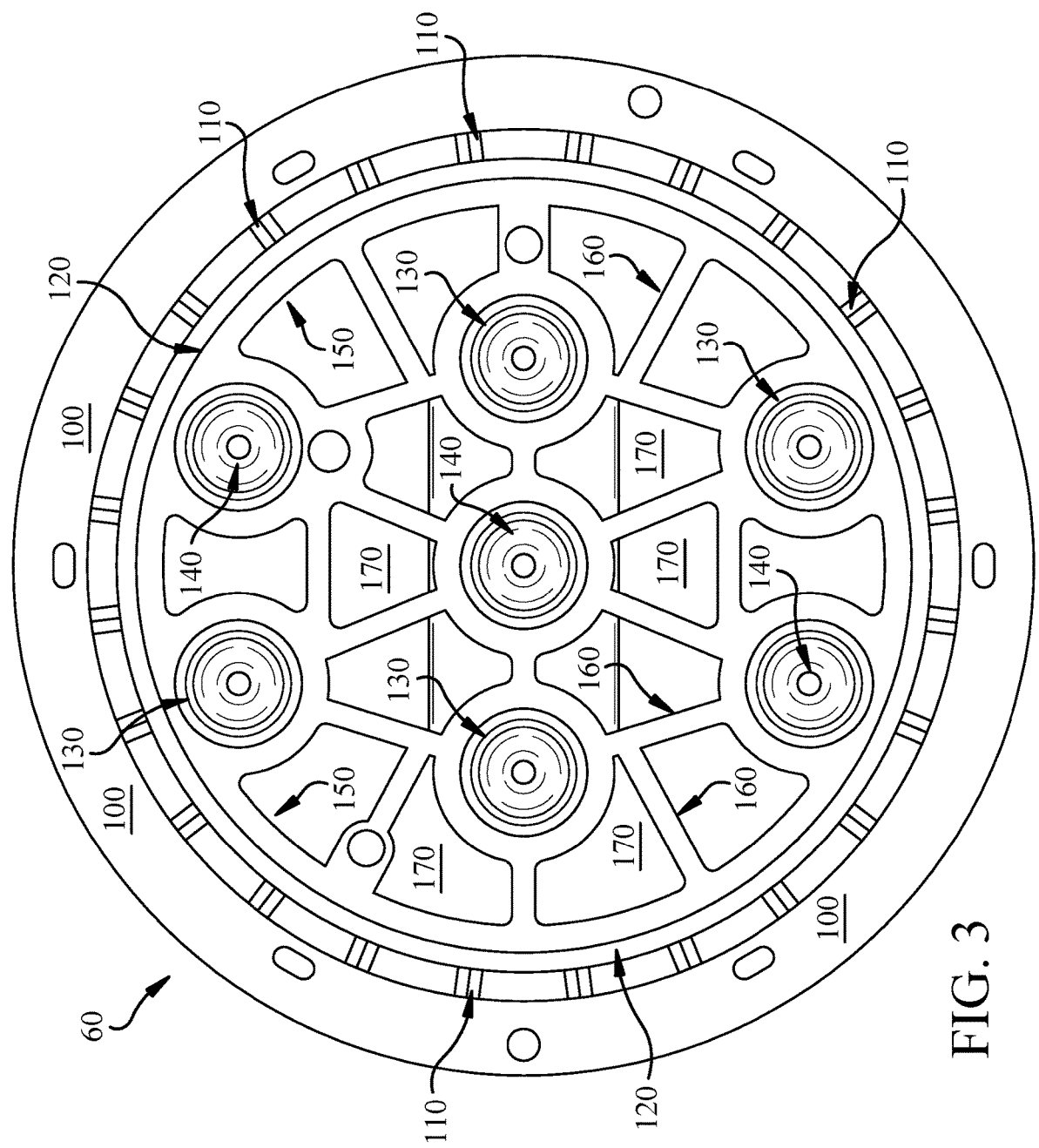
FIG. 3 shows a partial top sectional view of the keypad in FIG. 2.
Figure 4:
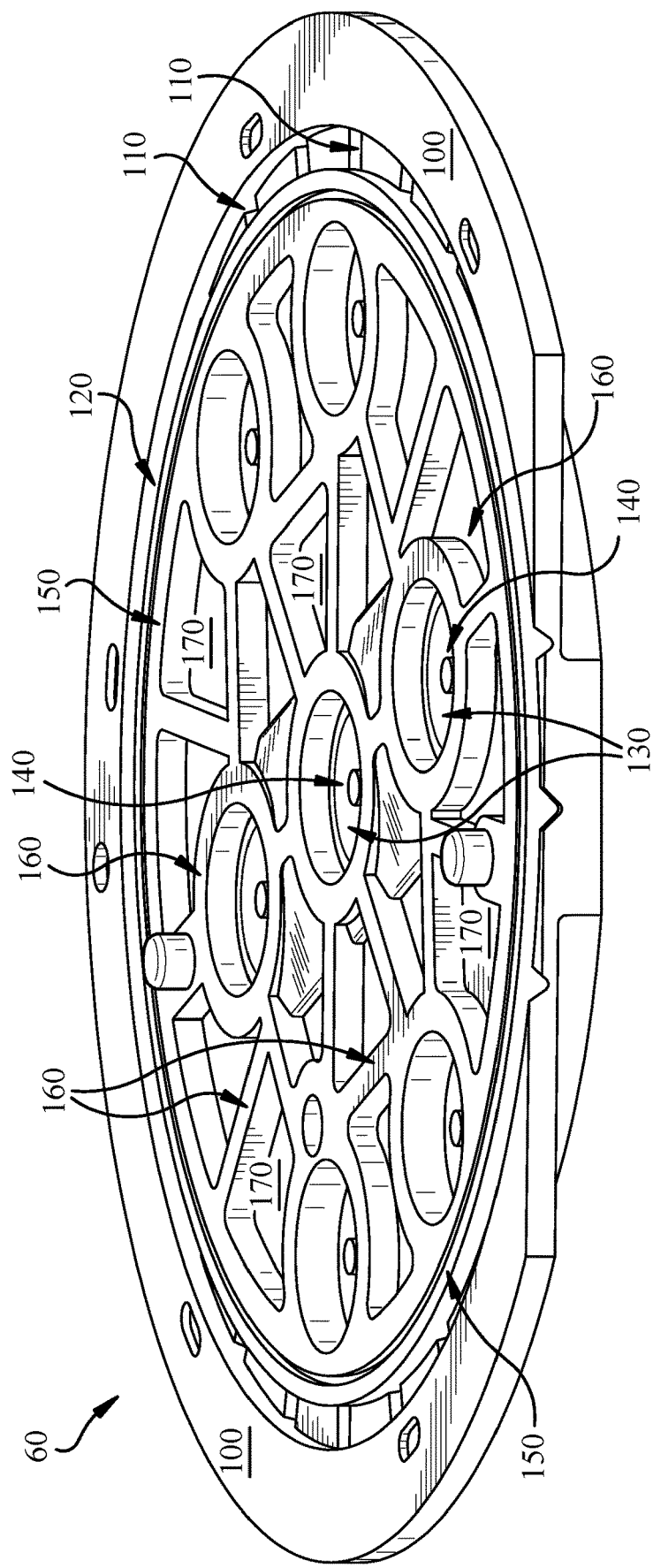
FIG. 4 shows a perspective view of the section of FIG. 3.

For example, FIG. 3 shows a top sectional view of a portion of the keypad 60 according to various implementations, and FIG. 4 shows a perspective view of the section in FIG. 3. As shown in these FIGURES, the keypad 60 can include a base 100 including an array of circumferentially separated slots 110. The base 100 can be formed of a metal, plastic or composite material that is molded, three-dimensionally printed or otherwise manufactured to include slots 110 that are arranged circumferentially about the base 100. In particular implementations, the base 100 is formed of silicone. It is understood that while the keypad 60 in this example depiction has a substantially circular shape, various other shapes can benefit from the teachings according to various implementations. For example, rectangular, oblong, or irregular shaped keypads with a continuous light ring can employ features of the keypad 60 to provide power-saving functions.

With continuing reference to FIGS. 3 and 4, the slots 110 are recessed into the base 100, and each have sufficient depth to hold a corresponding LED. In various implementations, each LED is configured to rest in a corresponding slot 110 and connect with an underlying circuit such as a printed circuit board (PCB). The LEDs are configured to emit light according to one or more prescribed functions, e.g., as controlled by the circuit, in some implementations, the slot 110 has a tapered (or angled) sidewall, such that a width of the slot as measured circumferentially around the base 100 is different at different depths of that slot 110. This taper angle can help to diffuse light from the LED during operation.

As shown in FIGS. 3 and 4, the keypad 60 can further include a core section 120 arranged radially inside the array of slots 110. As described herein, the core section 120 can include key slots 130 arranged in locations corresponding with keys (or buttons) 80 on the keypad 60. The key slots 130 can include contacts 140 that couple with the keys 80 (FIG. 2) and are configured to send a signal to the control circuitry (e.g., a circuit such as a PCB) to indicate actuation, e.g., by a user. In some cases, the key slots 130 are sized to accommodate one or more additional LEDs for illuminating the selectable keys (or, buttons) 80 in the core section 120.

In various implementations, the core section 120 includes a support structure 150 for supporting a cover, described with reference to additional FIGURES. In particular cases, the support structure 150 includes a plurality of skeletal members 160 separating recesses 170. The skeletal members 160 can be interconnected in any pattern, and are shown in one example configuration in FIGS. 3 and 4. The recesses 170, including the sidewalls of the skeletal members 160, can be substantially opaque, to prevent bleeding of light between the LEDs in the array of slots 110 and, the additional LEDs located in the core section 120. In particular implementations, surfaces in the recesses 170 are colored (e.g., black) to prevent light from bleeding through the core section 120. In additional particular implementations, the entire body of the core section 120 (e.g., the bulk material forming this section) is colored.

According to various implementations, the core section 120 can be formed of silicone, and in some cases, can be casemolded or additively manufactured (e.g., via three-dimensional printing). In some cases, the core section 120 is affixed (e.g., bonded, adhered, matingly coupled, force-fit, etc.) to the base 100. However, it is understood that the core section 120 can be integrally formed with the base 100, e.g., via casting, molding and/or additive manufacturing.

Figure 5:
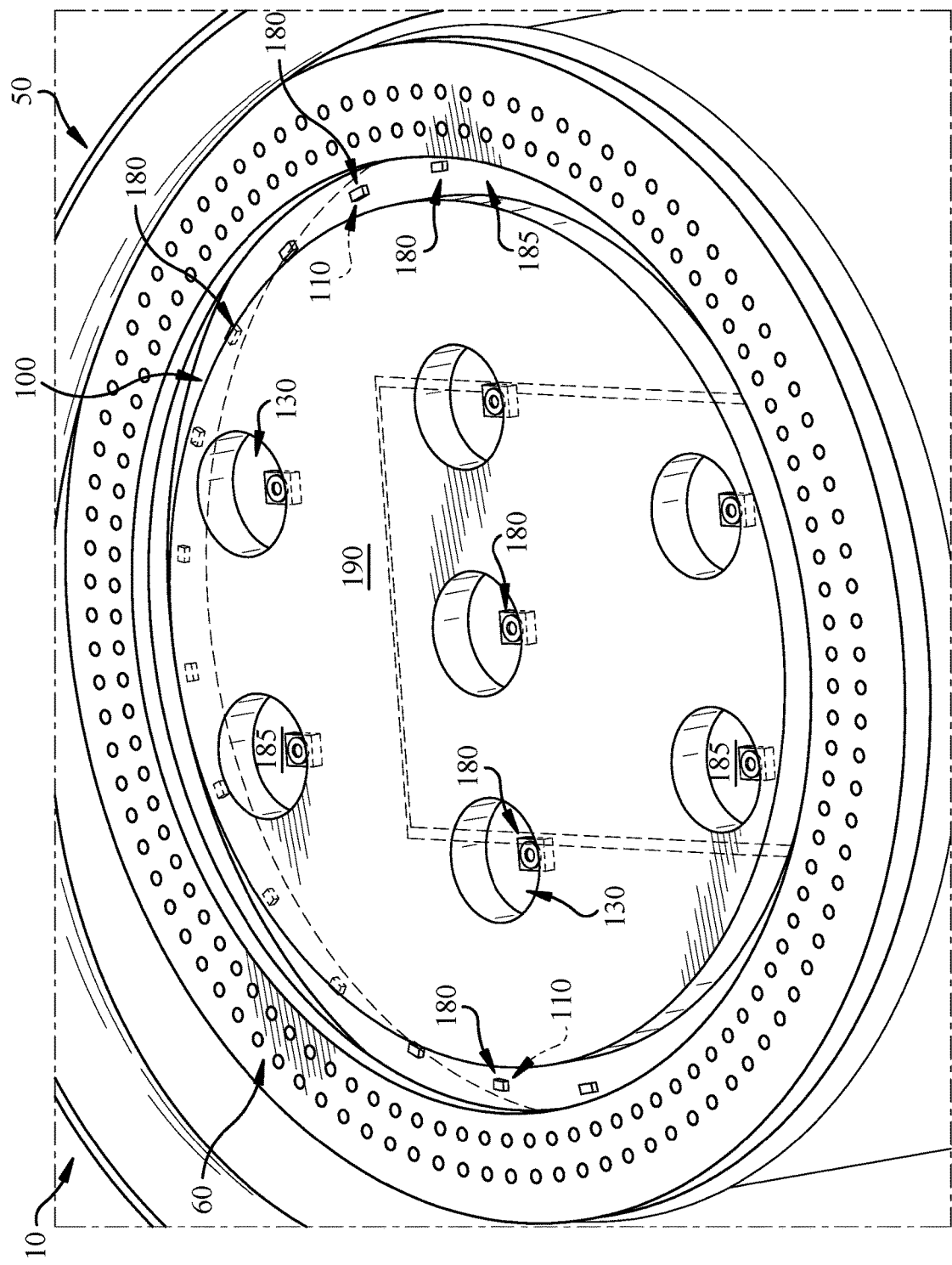
FIG. 5 shows a partially transparent perspective of the keypad in FIG. 2.
Figure 6:
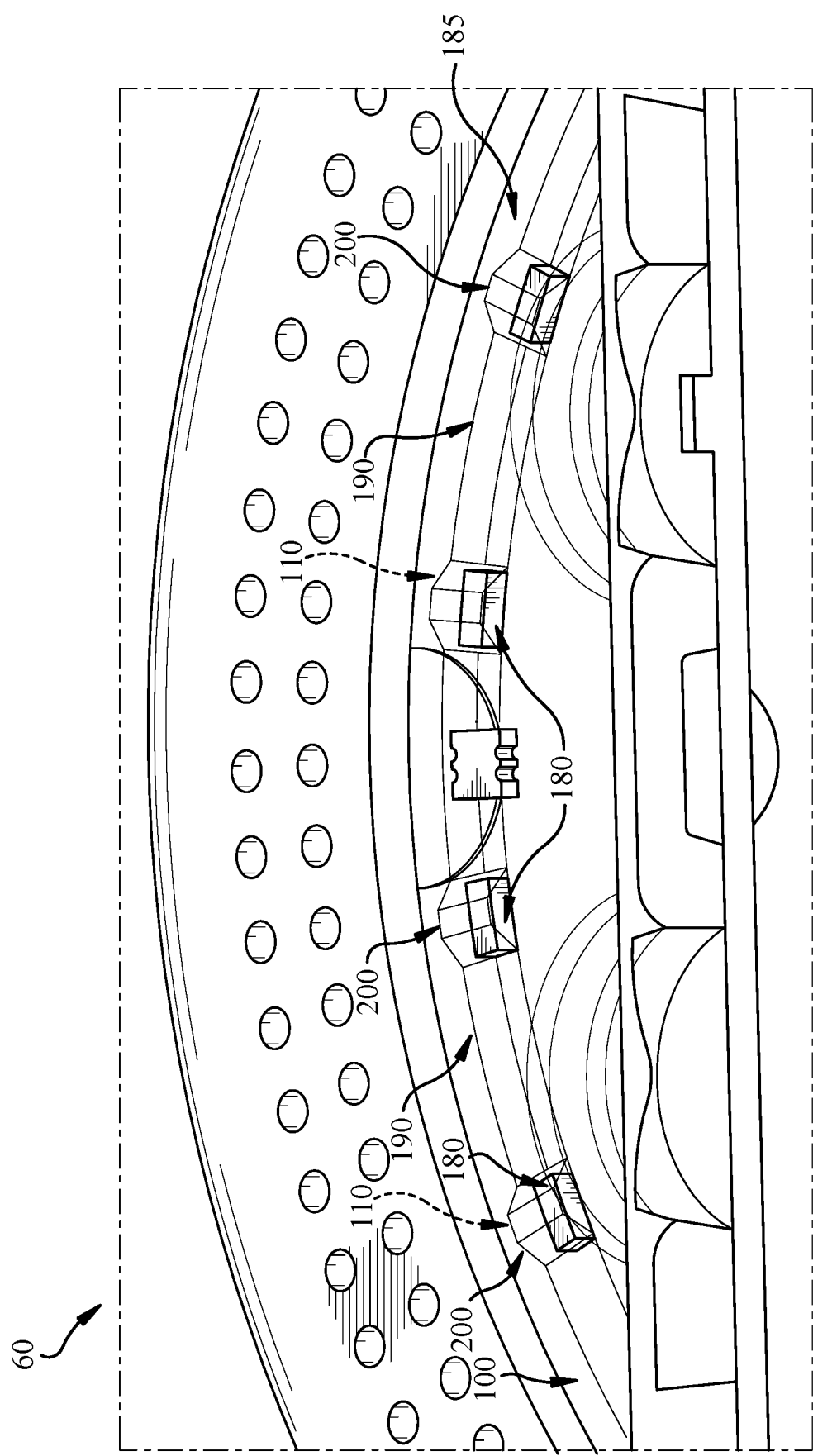
FIG. 6 shows a partially transparent top view of a portion of the keypad of FIG. 2.

FIG. 5 shows a partially transparent perspective of a top of the audio device 10, illustrating LEDs 180 located in the array of slots 110, as well as additional LEDs 180 located in the key slots 130. FIG. 6 shows a section of the view in FIG. 5, illustrating the LEDs 180 each located in a corresponding one of the slots 110 in the array within the base 100. In various implementations, the LEDs 180 are affixed (e.g., soldered, bonded, adhered, matingly coupled, force-fit, etc.) to a circuit board (e.g., printed circuit board) 185 that underlies the base 100, such that the LEDs 180 are aligned with the slots 110 in the base 100.

Also shown in FIGS. 5 and 6, with particular clarity in FIG. 6, is a cover 190 over the base 100 and the LEDs 180. The cover 190 can include a set of lenses 200 that each correspond with one of the LEDs 180 in the array of slots 110 in the base 100. The lenses 200 can form a space 210 (FIG. 7, FIG. 8) over each corresponding LED 180 to diffuse light from that LED 180. While lenses 200 are shown over the LEDs 180 located in the array of slots 110 in the base 100, it is understood that in additional example implementations, the cover 190 can also include additional lenses 200 located over the LEDs 180 that are located in the key slots 130. In various implementations, the cover 190 is transparent or translucent, in order to permit light from each LED 180 to pass therethrough. In some examples, the cover 190 includes silicone.

In various implementations, when the audio device 10 is powered (i.e., powered On), the set of LEDs 180 in the array is configured to provide a continuous ring of light around the keypad 60. That is, the set of LEDs 180 in the array of slots 110 is capable of providing a continuous ring of light around the keypad 60, such that the intensity of the light at any given portion of the ring is approximately consistent with a remainder of the ring. In particular cases, the intensity of the light is approximately consistent (e.g., within margin of error in measurement technique) around the keypad 60 as measured at a reference location, such as at the surface of the keypad 60 or proximate the surface of the keypad 60. In some cases, the continuous ring of light is defined as providing a substantially consistent intensity of light around the surface of the keypad 60 as perceived by a user, e.g., a human user. In particular implementations, the continuous ring of light is defined as having a minimum luminance around the keypad 60 (as measured from the surface) of approximately 150 $cd/m^2$ to approximately 185 $cd/m^2$. In more specific implementations, the continuous ring of light is defined as having a minimum luminance around the keypad 60 (as measured from the surface) of approximately 160 $cd/m^2$ to approximately 175 $cd/m^2$, and in even more specific implementations, approximately 167 $cd/m^2$ to approximately 168 $cd/m^2$.

As with most small point sources of light, each LED 180 can have a cone-shaped light emission. However, the angle of this light emission is such that without lenses 200, the light from adjacent LEDs 180 in the set would not overlap. That is, the lens 200 over each LED 180 widens the light emission from that underlying LED 180 such that the light emission from adjacent, LEDs 180 in the set of overlaps. In particular examples, a center-to-center separation of adjacent LEDs 180 in the array of slots 110, as measured along a circumferentially extending line, is at least approximately 8-12 millimeters (mm). In more particular cases, the center-to-center separation along the circumferentially extending line is at least approximately 10 mm. It is understood that the circumferentially extending line is a line that extends through all of the LEDs 180 in the set that are positioned in slots 110 around the base 100.

Figure 7:
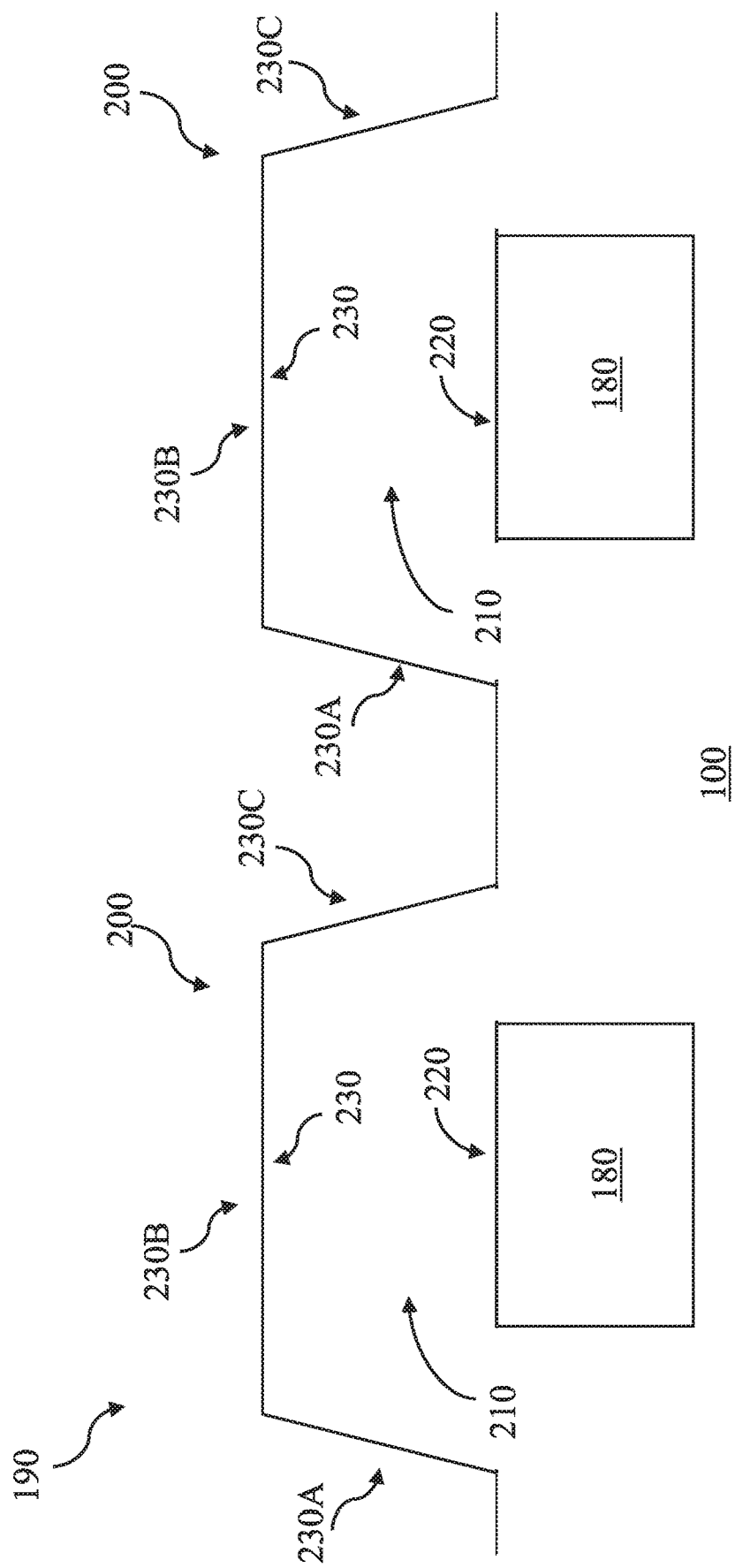
FIG. 7 is a schematic cross-sectional depiction of light emitting diodes (LEDs) and corresponding lenses in a cover according to various implementations.
Figure 8:
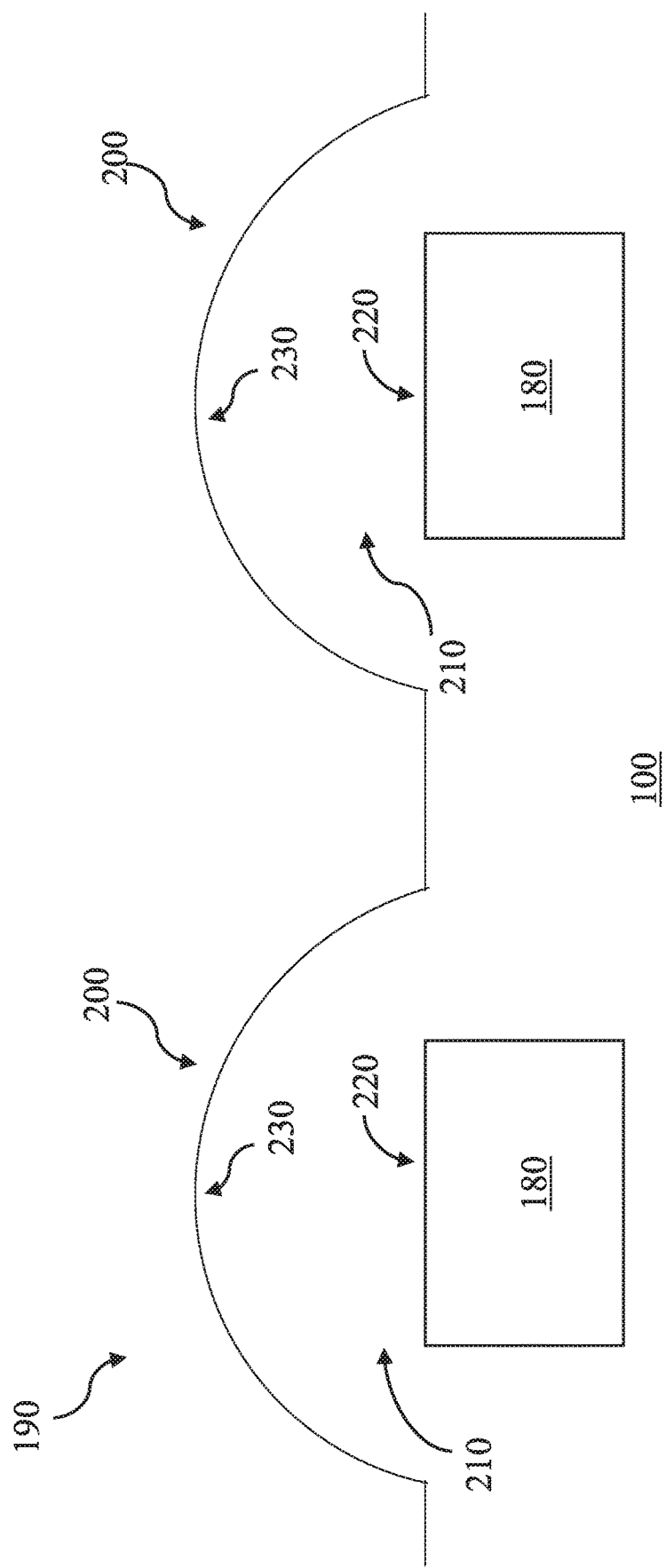
FIG. 8 is a schematic cross-sectional depiction of another LED and lens configuration according to various additional implementations.

FIG. 7 shows a cross-sectional view of an example set of lenses 200 overlying corresponding LEDs 180. According to various implementations, a top of each of the LEDs 180 is separated from the highest vertical point of the corresponding lens 200 by a distance of approximately 1-2 mm, and in some cases, by approximately 1.5 mm. In some examples, each LED 180 has an upper surface 220 that is separated from the lower surface 230 of the lens 200 (at the highest point of the lens 200) by at least 1 mm, and in some cases, by approximately 1.5 mm. Each lens 200 can have a curved shape, or include multiple sections with differing slopes (e.g., a first section with a first slope, a second section with a second slope, and a third section with a third slope). In the example depiction in FIG. 7, the lenses 200 are shown having three distinct sections 230A, 230B and 230C, each with differing slopes. However, as illustrated in FIG. 8, one or more of the lenses 200 can have a curved, or arcuate shape. FIG. 9 is a schematic depiction of adjacent LEDs 180 covered by lenses 200 with a peaked shape. This depiction illustrates light rays emitted from the respective LEDs 180, which are refracted through the lenses 200 in the cover 190. In this example, the lenses 200 can refract the light rays such that the space 245 between the adjacent LEDs 180 is illuminated at the surface of the cover 190 (as well as the surface of the keypad CO, not shown in this view). As is evident in the example of FIG. 9, the light intensity at the surface of the cover 190 is approximately consistent between locations that are directly over the LEDs 180 and the space 245 between the LEDs 180.

Figure 10B:
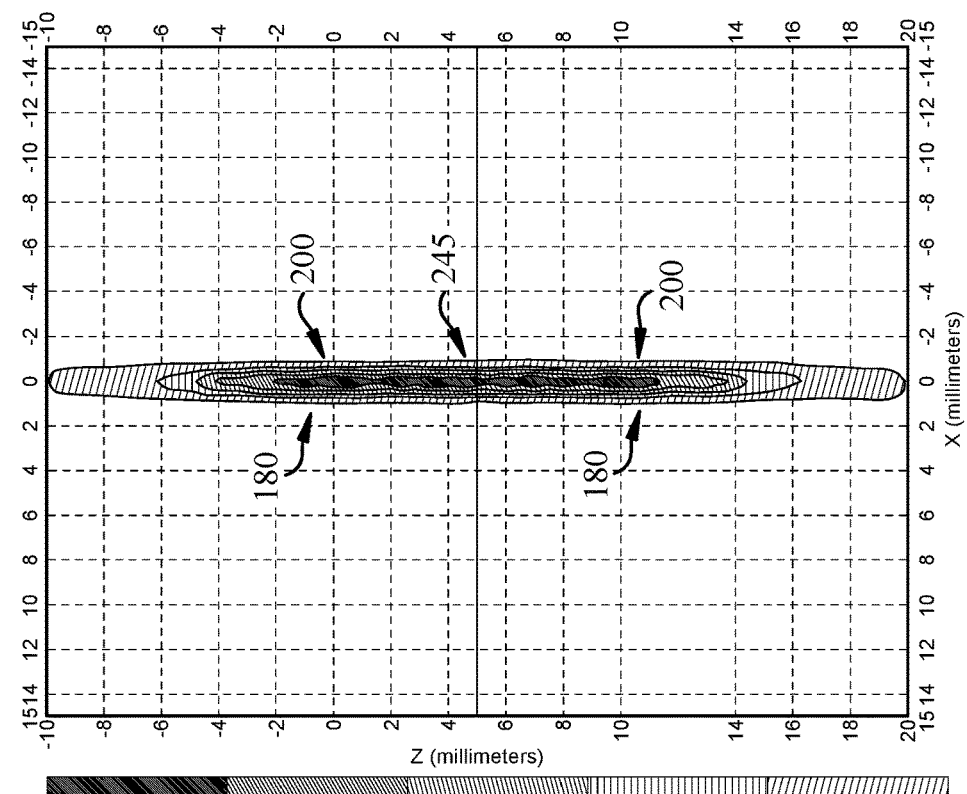
FIG. 10 is an example side-by-side graphical comparison of beam emissions in a conventional lighting configuration as compared with a lensed lighting configuration according to various implementations.
Figure 10A:
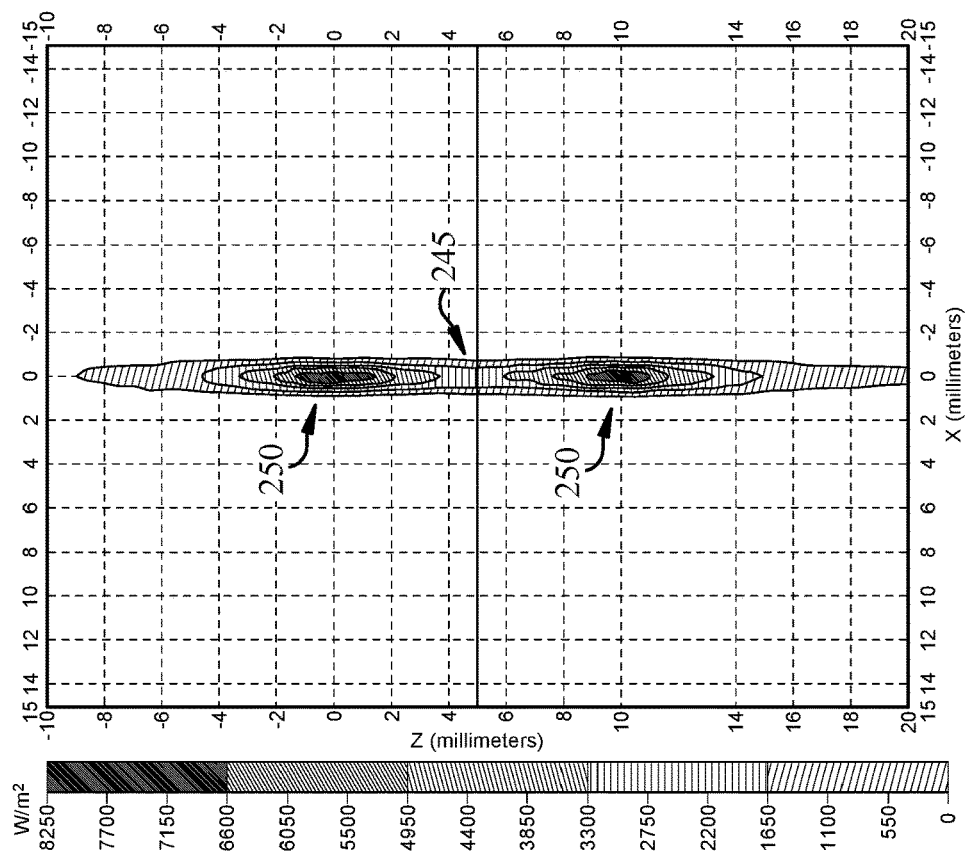

As described herein, regardless of its corresponding shape, each lens 200 diffuses the light from a corresponding one of the LEDs 180. FIG. 10 shows an example side-by-side graphical comparison of beam emissions in a conventional lighting configuration in graph (a), illustrating two adjacent un-lensed LEDs 250, along with a second graph (b), depicting beam emissions from two adjacent LEDs 180 having a corresponding lens 200 as described according to various implementations. In both example scenarios, adjacent LEDs are separated by ten (10) millimeters. As is evident in this side-by-side comparison, the lenses 200 (graph (b)) distribute the light emitted from the LEDs 180, avoiding the "dead spot", or drop in intensity in the space 245 between adjacent LEDs 180 illustrated in the conventional configuration (graph (a)). The implementations disclosed herein can significantly decrease the center-to-center spacing between adjacent LEDs 180 when compared with the conventional configuration.

For example, returning to FIGS. 1-5, with particular reference to FIG. 5, according to various implementations, each lens 200 diffuses the light from a corresponding one of the set of LEDs 180 such that when actuated according to a programmed pattern, the set of LEDs 180 can provide a continuous ring of light around the keypad 60. That is, the lenses 200 widen the light output from each LED 180 such that the display of light at the keypad 60 (i.e., as seen by a user) can form a continuous ring. In some particular examples, the audio device 10 can be programmed to provide a light display at the keypad 60 according to one or more patterns, e.g., to highlight functions of the audio device 10, augment audio playback, set mood, etc. In one particular example, the continuous ring of light can be displayed as a progressive ring of light in either a clockwise direction_ or a counterclockwise direction. In another particular example, LEDs 180 can be activated in flashing (on/off) manner individually or in sections of the array according to one or more prescribed patterns.

In any case, compared with a reference set of LEDs around a same circumferential distance as defined by the base 100, various implementations described herein can significantly reduce the number of LEDs used to provide the same or similar lighting effects. For example, the number of LEDs 180 arranged in the array along the base 100 can be approximately one-half as many LEDs as the reference set of LEDs with a substantially identical continuity in the ring of light around the keypad 60. That is, the configuration of LEDs 180 and corresponding lenses 200 can provide a substantially identical continuity in the ring of light as a reference set of up to two times the number of LEDs 180, without lenses 200. In some cases, the substantially identical continuity in the ring of light can be measured as the ratio of the highest intensity of light to the lowest intensity of light around the array, such that the naked human eye could not detect a significant difference in the continuity of light between the reference set and the implementations disclosed herein. In other words, the LEDs 180 in the array in the audio device 10 are spaced such that the light pattern of the LEDs 180 would not overlap at the keypad 60 without the lenses 200. This configuration provides a continuous ring of light around the keypad 60 without the cost of additional LEDs 180 and any related drivers that would be required in the conventional configurations to provide the continuous ring of light. As described herein, given the cost of individual LEDs, related drivers, and the complexity of integrating additional LEDs into a keypad, the audio device 10 can provide a significant cost savings when compared with conventional devices. Additionally, the audio device 10 may be more reliable due to the reduced complexity of the lighting configuration when compared with conventional devices.

It is understood that the relative proportions, sizes and shapes of the audio device 10 and components and features thereof as shown in the FIGURES included herein can be merely illustrative of such physical attributes of these components. That is, these proportions, shapes and sizes can be modified according to various implementations to fit a variety of products. For example, while a substantially tubular (or circular cross-sectional) shaped loudspeaker may be shown according to particular implementations, it is understood that the loudspeaker could also take on other three-dimensional shapes in order to provide acoustic functions described herein.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A keypad for an audio device, the keypad comprising:
   a base comprising an array of circumferentially separated slots;
   a set of light emitting diodes (LEDs) each located in a corresponding one of the slots in the base; and
   a cover over the base and the set of LEDs, wherein the cover comprises a set of lenses each corresponding with one of the LEDs and forming a space over the corresponding LED to diffuse light from the corresponding LED,
   wherein when powered, the set of LEDs is configured to provide a continuous ring of light around the keypad,
   wherein the continuous ring of light has a consistent intensity around the keypad as perceived by a human user, wherein the continuous ring of light has a minimum luminance around the keypad of approximately 150 cd/m$^2$ to approximately 185 cd/m$^2$, and
   wherein the set of LEDs and the set of lenses provides a substantially identical continuity in the ring of light around the keypad as a reference set of LEDs around a same circumferential distance as defined by the base, the reference set of LEDs comprising two times as many LEDs as the set of LEDs, without the set of lenses.

2. The keypad of claim 1, wherein the set of lenses comprises a plurality of distinct lenses each corresponding with a distinct one of the LEDs, wherein the lens over each LED widens a light emission from the LED such that the light emission from adjacent LEDs in the set of LEDs overlaps, and wherein the light emission from the LED is directly diffused by the lens.

3. The keypad of claim 1, wherein the cover comprises silicone.

4. The keypad of claim 1, further comprising a core section arranged radially inside the array, wherein the core section comprises additional LEDs for illuminating selectable buttons in the core section.

5. The keypad of claim 4, wherein the cover further comprises additional lenses each corresponding with one of the additional LEDs and forming a space over each corresponding additional LED to diffuse light from each corresponding additional LED,
   wherein the keypad further comprises a support structure in the core section for supporting the cover, and
   wherein the support structure prevents bleeding of light between the set of LEDs and the additional LEDs.

6. The keypad of claim 1, wherein a center-to-center separation of adjacent LEDs in the set along a circumferentially extending line is at least 8-12 millimeters.

7. The keypad of claim 1, wherein a top of each of the LEDs is separated from a corresponding lens by at least 1-2 millimeters.

8. The keypad of claim 1, wherein each of the lenses has a curved shape or comprises multiple sections having distinct slopes.

9. The keypad of claim 1, wherein each lens diffuses the light from a corresponding one of the set of LEDs such that when actuated according to a programmed pattern, the set of LEDs provide a continuous, progressive ring of light in either a clockwise direction or a counterclockwise direction.

10. An audio device comprising:
a transducer for providing an acoustic output;
a control circuit for controlling the acoustic output at the transducer; and
a keypad coupled with the control circuit for receiving interface commands, the keypad comprising:
  a base comprising an array of circumferentially separated slots;
  a set of light emitting diodes (LEDs) each located in a corresponding one of the slots in the base; and
  a cover over the base and the set of LEDs, wherein the cover comprises a set of lenses each corresponding with one of the LEDs and forming a space over the corresponding LED to diffuse light from the corresponding LED,
  wherein when powered, the set of LEDs is configured to provide a continuous ring of light around the keypad,
  wherein the continuous ring of light has a consistent intensity around the keypad as perceived by a human user, wherein the continuous ring of light has a minimum luminance around the keypad of approximately 150 cd/m$^2$ to approximately 185 cd/m$^2$, and
  wherein the set of LEDs and the set of lenses provides a substantially identical continuity in the ring of light around the keypad as a reference set of LEDs around a same circumferential distance as defined by the base, the reference set of LEDs comprising two times as many LEDs as the set of LEDs, without the set of lenses.

11. The audio device of claim 10, further comprising a core section arranged radially inside the array, wherein the core section comprises:
additional LEDs for illuminating selectable buttons in the core section; and
a support structure for supporting the cover,
wherein the cover further comprises additional lenses each corresponding with one of the additional LEDs and forming a space over the corresponding additional LED to diffuse light from the corresponding additional LED, and
wherein the support structure prevents bleeding of light between the set of LEDs and the additional LEDs.

12. The audio device of claim 10, wherein each lens diffuses the light from a corresponding one of the set of LEDs such that when actuated according to a programmed pattern, the set of LEDs provide a continuous, progressive ring of light in either a clockwise direction or a counterclockwise direction.

13. The audio device of claim 10, wherein a center-to-center separation of adjacent LEDs in the set along a circumferential line is at least 8-12 millimeters, and wherein a top of each of the LEDs is separated from the corresponding lens by at least: 1-2 millimeters.

14. The audio device of claim 10, wherein the set of lenses comprises a plurality of distinct lenses each corresponding with a distinct one of the LEDs, wherein the lens over each LED widens a light emission from the LED such that the light emission from adjacent LEDs in the set of LEDs overlaps, and wherein the light emission from the LED is directly diffused by the lens.

15. The audio device of claim 10, wherein the substantially identical continuity in the ring of light is measured as a ratio of a highest intensity of light to a lowest intensity of light around the array, such that a naked eye of the human user cannot detect a significant difference in the continuity of light produced by the reference set and the keypad.

16. A keypad for an audio device, the keypad comprising:
a base comprising an array of circumferentially separated slots;
a set of light emitting diodes (LEDs) each located in a corresponding one of the slots in the base; and
a cover over the base and the set of LEDs, wherein the cover comprises a set of lenses each corresponding with one of the LEDs and forming a space over the corresponding LED to diffuse light from the corresponding LED,
wherein when powered, the set of LEDs is configured to provide a continuous ring of light around the keypad,
wherein the continuous ring of light has a consistent intensity around the keypad as perceived by a human user, wherein the continuous ring of light has a minimum luminance around the keypad of approximately 150 cd/m$^2$ to approximately 185 cd/m$^2$,
wherein the set of LEDs and the set of lenses provides a substantially identical continuity in the ring of light around the keypad as a reference set of LEDs around a same circumferential distance as defined by the base, the reference set of LEDs comprising two times as many LEDs as the set of LEDs, without the set of lenses,
wherein the substantially identical continuity in the ring of light is measured as a ratio of a highest intensity of light to a lowest intensity of light around the array, such that a naked eye of the human user cannot detect a significant difference in the continuity of light produced by the reference set and the keypad.

* * * * *